(12) United States Patent
Brakmann et al.

(10) Patent No.: US 6,386,522 B2
(45) Date of Patent: May 14, 2002

(54) AIR SPRING HAVING AN ELASTOMERIC FLEXIBLE MEMBER

(75) Inventors: Jörn Brakmann, Hannover; Detlef Wenzel, Barsinghausen; Ulrich Hesberg, Isernhagen, all of (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 09/730,758

(22) Filed: Dec. 7, 2000

(30) Foreign Application Priority Data

Dec. 8, 1999 (DE) .......................... 199 59 011

(51) Int. Cl.$^7$ ................................. F16F 9/04
(52) U.S. Cl. ....................................... 267/27
(58) Field of Search .................. 267/64.19, 64.21, 267/64.23, 64.24, 64.27

(56) References Cited

U.S. PATENT DOCUMENTS 5,346,187 A * 9/1994 Drescher ................. 267/64.11
5,954,316 A * 9/1999 Voss ........................ 267/64.27

* cited by examiner

Primary Examiner—Paul N. Dickson
Assistant Examiner—C. T. Bartz
(74) Attorney, Agent, or Firm—Walter Ottesen

(57) ABSTRACT

The invention is directed to an air spring having an elastomeric air spring flexible member with its ends attached to respective attachment components. The ends of the flexible member have respective sealing beads. An elastic peripherally extending sealing lip (41) is formed on the end portion of at least one of the ends of the flexible member and projects beyond the end face of the end portion and lies on the smallest diameter of the flexible member. The sealing lip (41) ensures a reliable sealing between this end of the flexible member and the attachment component. The sealing lip (41) faces toward the pressure space of the air spring in the assembled condition thereof.

5 Claims, 6 Drawing Sheets

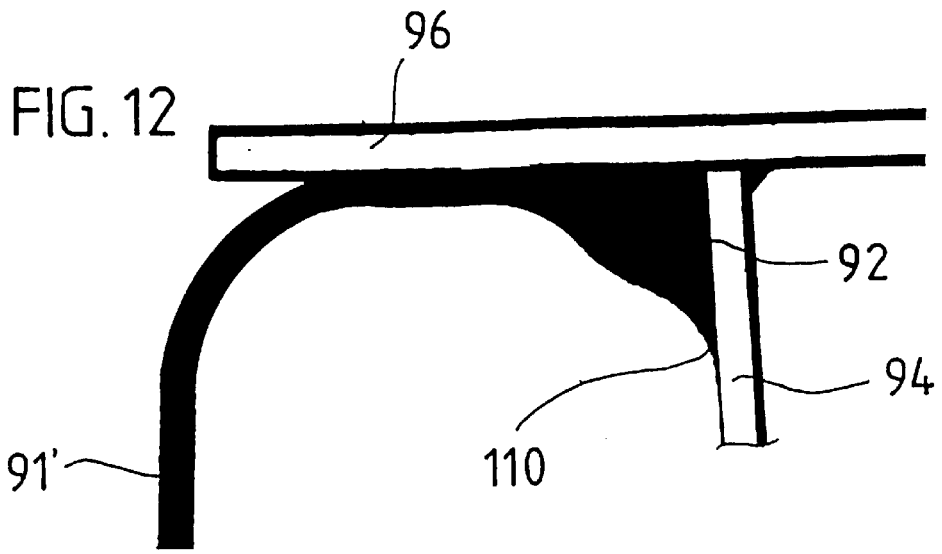
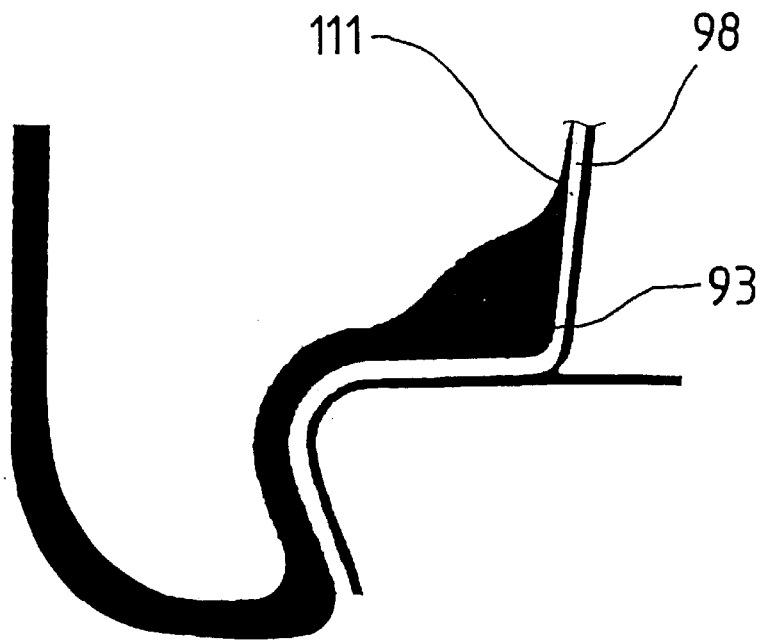

AIR SPRING HAVING AN ELASTOMERIC FLEXIBLE MEMBER

FIELD OF THE INVENTION

The invention relates to an air spring having an elastomeric air spring flexible member having respective ends which are tightly attached to respective attachment components. The air spring flexible member forms an air spring volume which is closed off and can be charged with pressure. Each of the ends of the flexible member has a conical or clampable sealing bead.

BACKGROUND OF THE INVENTION

Air springs having a flexible member of elastomeric material have been proved for decades as load controllable spring elements in the area of vehicle manufacture and in industrial areas. The air spring flexible member is sealed off at the two open ends by means of attachment components and is attached via these attachment components, for example, to road motor vehicles between chassis and axle.

Basically, one distinguishes the air spring flexible members as rolling-lobe flexible members and as folding flexible members. In rolling-lobe flexible members, one of the two attachment components is configured as a so-called roll-off piston on which the rolling lobe of the rolling-lobe flexible member can run.

Various sealing connecting types are known in order to obtain a tight seat of the ends of the air spring flexible member on the attachment components. The flexible member ends have either sealing beads with conical sealing surfaces or are attached via clampable sealing beads to the attachment components. For rolling-lobe flexible members, the flexible member end, which lies opposite the rolling lobe, is often provided with a clampable sealing bead which is connected to the bent-over plate defining the attachment component; whereas, the end of the flexible member, which seats tightly on the roll-off piston, is configured as a conical seal seat.

Air spring flexible members having clampable sealing beads are either screw connected tightly to an attachment component configured as a bent-over plate or screw connected to the attachment component by means of a peripherally extending attachment part. By bending over the edge of the plate around the clampable sealing bead, a form-tight and sealing connection is provided between the two parts.

The seal tightness of the form-tight connection between the flexible member end and the attachment component is not always satisfactory over a long period of time. Fluctuations in material and tolerances of the components can prevent the manufacture of a uniform clamping gap when bending over the edge of the attachment plate. The rubber layer which defines the sealing surface in the clamping gap is often so thin that gap nonuniformities cannot always be reliably compensated. In the worst case, leaks can occur and these require considerable supplemental work.

SUMMARY OF THE INVENTION

It is an object of the invention to provide an air spring of the kind described above wherein a reliable and more secure seal is made possible between the respective ends of the flexible member and the attachment components.

The air spring of the invention includes: a first attachment component; a second attachment component; an annular flexible member made of elastomeric -material and having first and second end portions tightly attached to the first and second attachment components, respectively; the end portions having respective sealing beads defining respective seals with the attachment components; the flexible member and the attachment components conjointly defining a closed off air spring volume which can be charged with pressurized air; at least one of the attachment components having an inner wall surface facing toward and delimiting the closed off air spring volume; the flexible member having an end face at at least one of the end portions; an elastic peripherally extending sealing projection formed on at least the one end portion so as to project away from the end face and so as to define a smallest diameter of the flexible member; the sealing projection being configured to face directly toward the air spring volume so as to be subjected to the charge of pressurized air; and, the sealing projection having an inherent stress causing the sealing projection to lie in sealing contact engagement against the inner wall surface of the one attachment component corresponding to the one end portion.

The peripherally extending sealing lip is on the inner periphery of at least one of the ends of the flexible member. The sealing lip projects beyond the end face of the flexible member so that the sealing lip swings away laterally in the direction of the end face plane when pressed against the seal seat or the attachment component because of the elastic configuration and presses against the attachment component because of its inherent stress opposing this swing direction. In this way, a sealing action is obtained directly to the pressure chamber, that is, the air spring volume. This sealing lip arrangement lies forward of the main seat where the sealing bead is clamped and has only the function of sealing. The holding function is performed by the sealing bead so that a reliable separation of the two functions is ensured.

According to a feature of the invention, the sealing lip is configured so as to have a rectangular shape. This embodiment is characterized by an excellent forming and has an enlarged elastic portion against the sealing surface.

According to another embodiment of the invention, the sealing lip is tapered toward its end and is configured to be inclined toward the interior of the flexible member. This sealing lip lies snugly against the attachment component.

In still another embodiment of the invention, the sealing lip is provided with a slit and, according to still another embodiment, the sealing lip can be configured so as to be half round. These configurations can form themselves especially well and have an increased elastic portion against the sealing surface.

BRIEF DESCRIPTION OF THE DRAWINGS

The invention will now be described with reference to the drawings wherein:

FIG. 12 is a detail view showing the upper conical sealing seat of the flexible member shown in FIG. 11 in the built-in state; and, FIG. 13 shows the lower sealing seat of the built-in flexible member shown in FIG. 11.

DESCRIPTION OF THE PREFERRED EMBODIMENTS OF THE INVENTION

Figure 1:
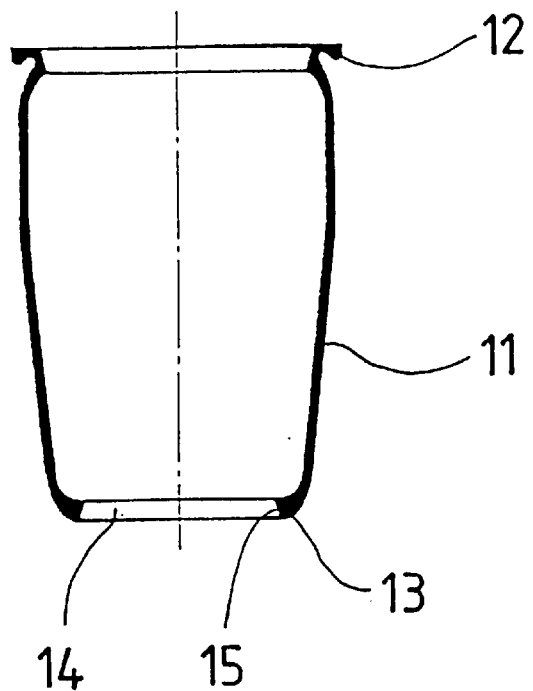
FIG. 1 is a schematic of an air spring flexible member in the manufactured state and configured as a rolling-lobe flexible member.

In FIG. 1, an air spring flexible member is shown in accordance with the state of the art and in schematic longitudinal section. The air spring flexible member 11 is conically tapered downwardly and is a rolling-lobe flexible member. This flexible member 11 is made of rubber or rubber-like plastic having embedded reinforcement and defines a hose body extending out at both ends into respective sealing beads 12 and 13. The upper sealing bead 12 projects peripherally beyond the periphery of the flexible member and is a clampable sealing bead because of its backcut.

The lower end opening 14 is included within an integrated sealing bead 13 defining a conical sealing surface 15.

Figure 2:
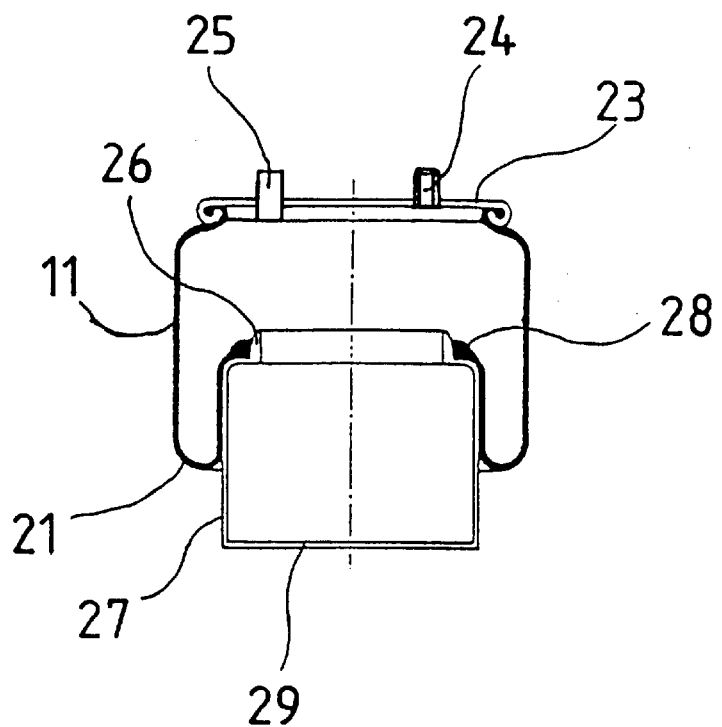
FIG. 2 is a schematic showing an assembled air spring incorporating the flexible member of FIG. 1.

In FIG. 2, an air spring is shown in the assembled state wherein the flexible member 11 defines a rolling lobe 21. The upper sealing bead of the flexible member 11 is connected to a bent-over plate 23. The bent-over plate 23 can be threadably fastened to a vehicle chassis via threaded fasteners 24. The bent-over plate 23 includes an air connection 25 via which the flexible member 11 can be connected to a source of pressurized air (not shown).

The flexible member 11 has a lower end 14 which is delimited by the conical sealing bead 13. The flexible member 11 is attached with its opening 14 onto conical seal seat 26 of a roll-off piston 27 which is formed of sheet metal. The conical seal seat 26 is of lesser diameter than the roll-off piston 27 and lies on the upper end 28 of the piston 27. The roll-off piston 27 is closed off air tight by a base 29. The roll-off piston 27 is attached to a vehicle axle (not shown) via threaded projections (also not shown).

Figure 3:
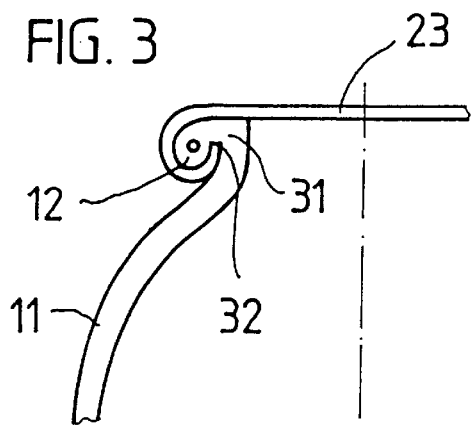
FIG. 3 is a bent-over connection in accordance with the known state of the art between a rolling-lobe flexible member and an attachment component configured as a bent-over plate.

The enlarged detail view of FIG. 3 shows that the attachment component 23 is tightly clamped to the clampable sealing bead 12 by bending over the edge portion of the attachment plate. In this way, a form-tight and sealing connection is established. The clamp gap 31 between the upwardly bent-over edge portion 32 of the plate 23 and the plate 23 itself ensures a form-tight holding and seal-tight connection between the two components. Because of the manufacturing tolerances of the components, it cannot be precluded that the clamping gap 31 has different widths over its periphery.

Figure 4:
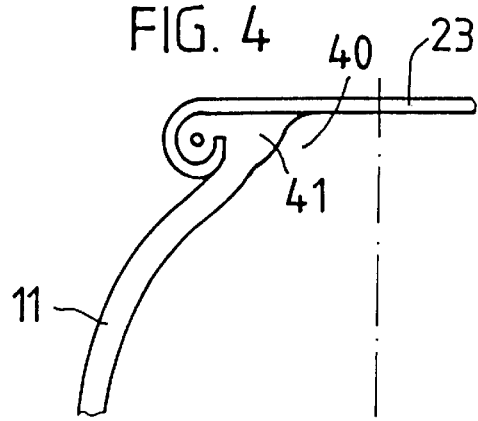
FIG. 4 shows a bent-over connection between a flexible member having an end sealing lip or end sealing projection in accordance with the invention.

In FIG. 4, the same bent-over edge connection is shown at an end of a flexible member which has a sealing lip 41 directly encircling the opening 40 of the flexible member. This sealing lip 41 is forcibly swung over in the direction of the opening 40 of the flexible member because of the bending over of the edge portion of the plate 23. This sealing lip lies seal-tight against the plate 23 because of its inherent stress.

Figure 5:
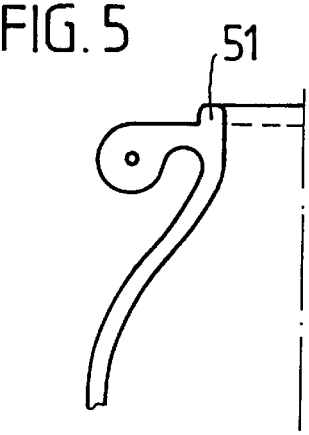
FIGS. 5 to 8 are detail views showing various geometric configurations of the end sealing lip or end sealing projection of an air spring flexible member.

FIG. 5 shows a configuration of the sealing lip 51 which projects beyond the end face surface of the end of the flexible member. The sealing lip 51 has the geometric form of a narrow rectangle.

Figure 6:
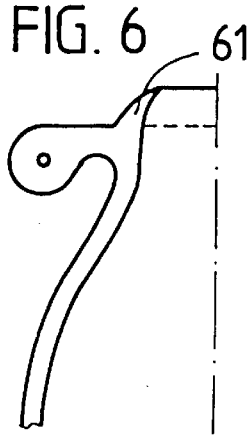
Figure 6A:
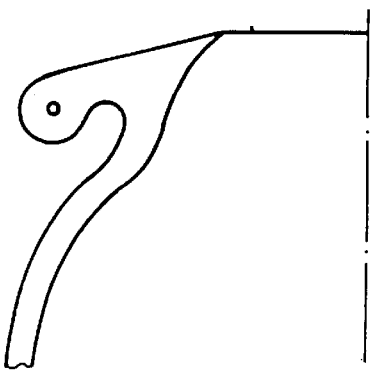

In FIG. 6, the sealing lip 61 is configured so as to be tapered toward its end and further configured to swing in toward the opening of the flexible member. In FIG. 6a, the sealing lip is so formed that it not only projects into the pressure space but also the sealing surface is configured to have a wedge shape. This increases the portion of elastic material which is available for sealing purposes. When placing the horizontal bent-over plate, that is, the attachment component, the wedge-shaped sealing lip is pressed downwardly.

Figure 7:
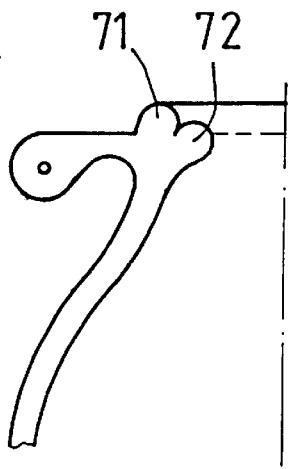
Figure 8:
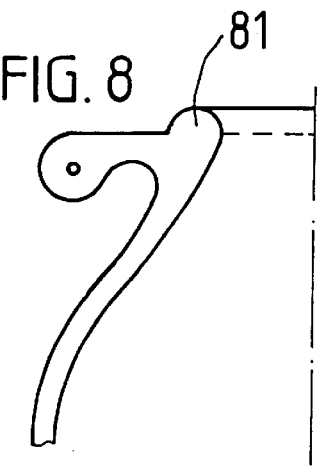

The configuration of FIG. 7 shows the sealing lip 71 as a two-part sealing body because of a slit 72. In FIG. 8, the sealing lip 81 is configured to be half round.

Figure 9:
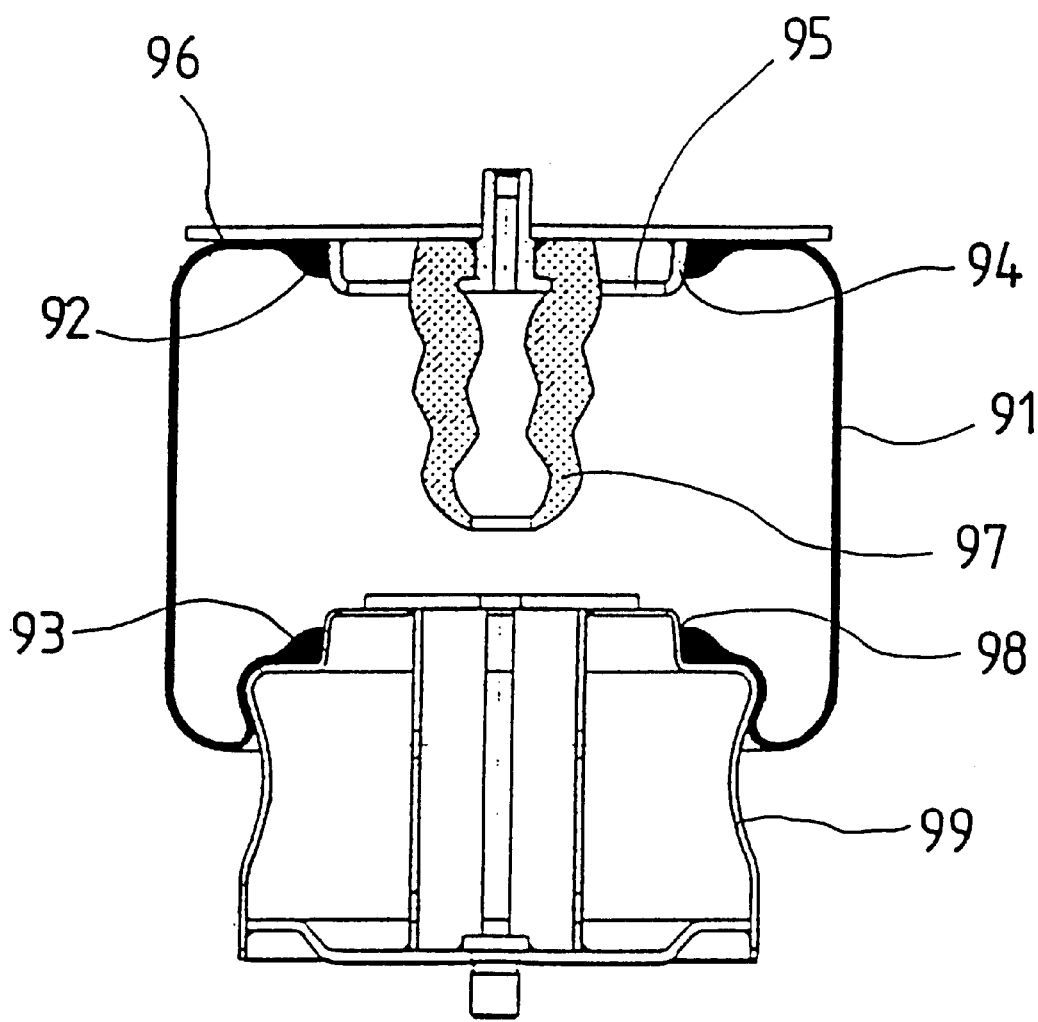
FIG. 9 shows an assembled air spring having a flexible member with conical sealing beads.

In FIG. 9, an air spring is shown in the assembled state and has a flexible member 91. The flexible member 91 has respective sealing beads (92, 93) at respective ends and these sealing beads have a conical sealing seat. The upper conical sealing bead 92 lies on a central protrusion 95 of an attachment plate 96. The projection 95 has a conical sealing surface 94. An elastic bumper 97 is mounted on the plate 96 and projects inwardly. The flexible member 91 is clamped with its lower end onto a conical seal seat 98 of a roll-off piston 99. The lower end opening of the flexible member is delimited by the conical sealing bead 93.

Figure 10:
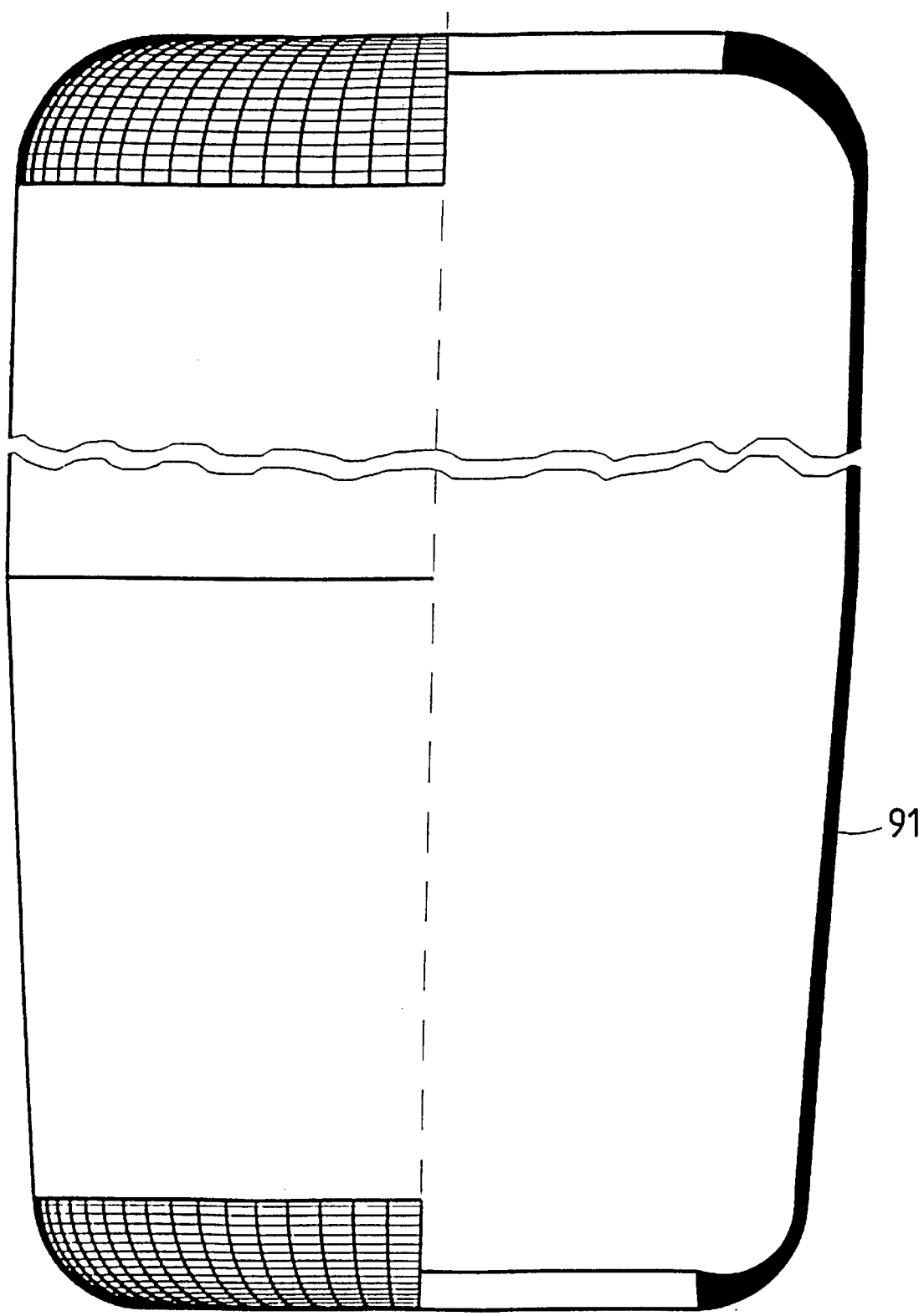
FIG. 10 shows the air spring flexible member of FIG. 9 in the manufactured state.

In FIG. 10, a flexible member 91 known per se of the air spring of FIG. 9 is shown in schematic section.

Figure 11:
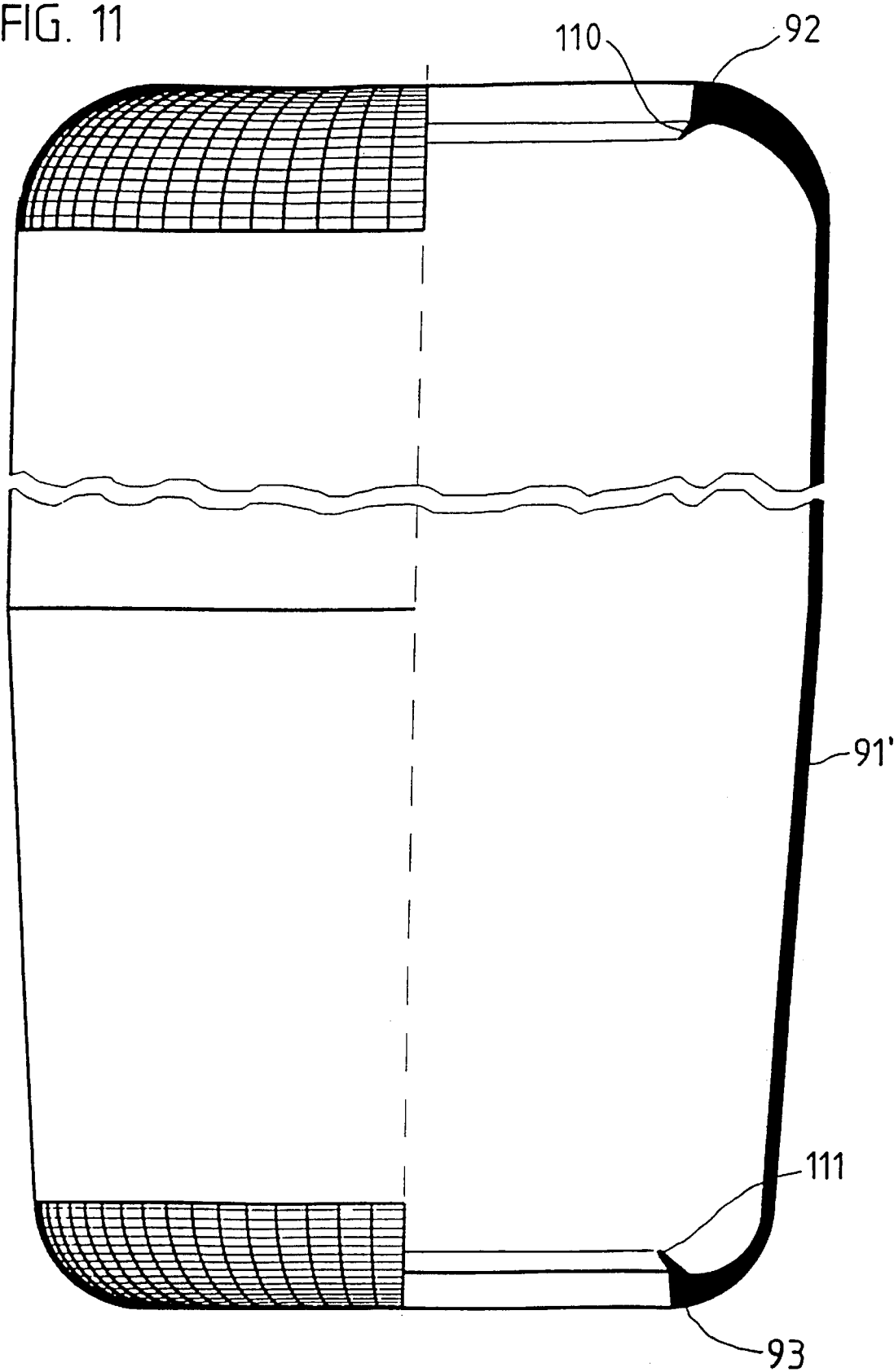
FIG. 11 shows a flexible member as in FIG. 10 with additional end sealing lips or sealing projections in accordance with the invention.

In FIG. 11, the rolling-lobe flexible member 91' of FIG. 10 is shown modified in accordance with the invention and, different from the state of the art, it has peripherally extending sealing lips (110, 111) on respective ones of the sealing beads (92, 93). The peripherally extending sealing lips (110, 111) enclose or encircle the respective openings of the flexible member. The sealing lips (110, 111) lie against the conical sealing surfaces (94, 98), respectively, of the respective conical sealing seats as shown in FIGS. 12 and 13 in the built-in state.

It is understood that the foregoing description is that of the preferred embodiments of the invention and that various changes and modifications may be made thereto without departing from the spirit and scope of the invention as defined in the appended claims.

What is claimed is:

1. An air spring comprising:

a first attachment component;

a second attachment component;

an annular flexible member made of elastomeric material and having first and second end portions tightly attached to said first and second attachment components, respectively;

said end portions having respective sealing beads defining respective seals with said attachment components;

said flexible member and said attachment components conjointly defining a closed off air spring volume which can be charged with pressurized air;

at least one of said attachment components having an inner wall surface facing toward and delimiting said closed off air spring volume;

said flexible member having an end face at at least one of said end portions;

an elastic peripherally extending sealing projection formed on at least said one end portion so as to project away from said end face and so as to define a smallest diameter of said flexible member;

said sealing projection being configured to face directly toward said air spring volume so as to be subjected to said charge of pressurized air; and, said sealing projection having an inherent stress causing said sealing projection to lie in sealing contact engagement against said inner wall surface of said one attachment component corresponding to said one end portion.

2. The air spring of claim 1, wherein said sealing projection is configured so as to have rectangular shape when viewed in section.

3. The air spring of claim 1, wherein said sealing projection is configured to be tapered toward the end thereof and to be inclined toward the interior of said flexible member.

4. The air spring of claim 1, wherein said sealing projection has a slit formed therein.

5. An air spring comprising:

a first attachment component;

a second attachment component;

an annular flexible member made of elastomeric material and having first and second end portions tightly attached to said first and second attachment components, respectively;

said end portions having respective sealing beads defining respective seals with said attachment components;

said flexible member and said attachment components conjointly defining a closed off air spring volume which can be charged with pressurized air;

said flexible member having an end face at the end of at least one of said end portions defining a smallest diameter of said flexible member;

an elastic sealing lip formed on said one end portion so as to project beyond said end face and extend peripherally therealong at said smallest diameter;

said sealing lip being configured to face toward said air spring volume when said air;spring is assembled;

said sealing lip having an inherent stress causing said sealing lip to lie in sealing contact engagement against the attachment component corresponding to said one of said end portions; and, said sealing lip being configured to be half round.

\* \* \* \* \*